United States Patent [19]

Taniyama

[11] Patent Number: 5,775,491
[45] Date of Patent: Jul. 7, 1998

[54] COMPACT DISK TRAY AND COVER THEREFOR

[75] Inventor: Yoshihiko Taniyama, Alpharetta, Ga.

[73] Assignee: Atlanta Precision Molding Company, Duluth, Ga.

[21] Appl. No.: 648,534

[22] Filed: May 15, 1996

[51] Int. Cl.[6] .................................................. B65D 85/57
[52] U.S. Cl. ...................... 206/308.1; 206/310; 206/313
[58] Field of Search ................................. 206/307–313, 206/308.1, 308.2

[56] References Cited

U.S. PATENT DOCUMENTS

| | | | |
|---|---|---|---|
| 2,866,541 | 12/1958 | Ravis | 206/313 |
| 3,279,594 | 10/1966 | Worthington, III | 206/312 |
| 4,627,531 | 12/1986 | Clemens | 206/309 |
| 4,702,369 | 10/1987 | Philosophe | 206/312 |
| 4,749,081 | 6/1988 | Carlson | 206/308.1 |
| 4,903,829 | 2/1990 | Clemens | 206/310 |
| 5,048,681 | 9/1991 | Henkel | 206/313 |
| 5,147,036 | 9/1992 | Jacobs | 206/313 |
| 5,265,721 | 11/1993 | Castritis | 206/308.1 |
| 5,379,890 | 1/1995 | Mahler | 206/313 |
| 5,505,299 | 4/1996 | Ditzig et al. | 206/308.1 |
| 5,529,182 | 6/1996 | Anderson et al. | 206/308.1 |

*Primary Examiner*—Jimmy G. Foster
*Attorney, Agent, or Firm*—Troutman Sanders LLP; Gerald R. Boss

[57] ABSTRACT

An enclosure system for protecting and securing an optical disk includes a tray adapted to house the disk, and a receptacle adapted to receive the tray and disk. The receptacle may be formed from a sheet of foldable material. The receptacle may include an extension for attaching the enclosure system to a retail delivery means, such as a magazine centerfold or a technical publication. The receptacle may also include retaining means for preventing the tray from moving with respect to the receptacle during the shipping and handling stages of product distribution. The retaining means may comprise an outer layer of thin sheet material wrapped around the receptacle or a glue spot securing inside surfaces of the foldable sheet together to secure the tray. The enclosure system may also include motion limiting means for limiting a distance by which the tray slides out of the receptacle and for preventing the tray from being completely removed from the receptacle when accessing the compact disk stored therein.

26 Claims, 9 Drawing Sheets

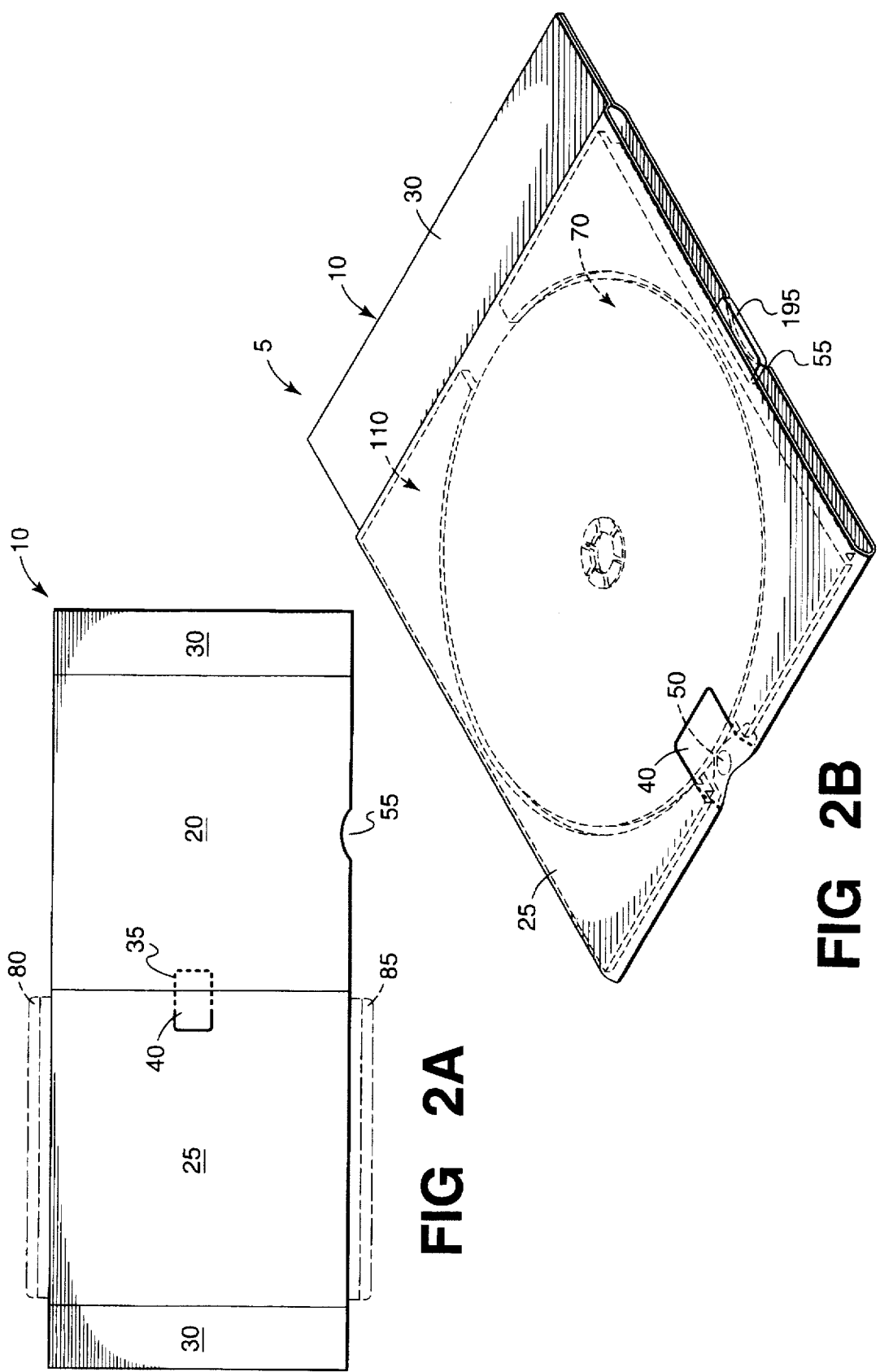

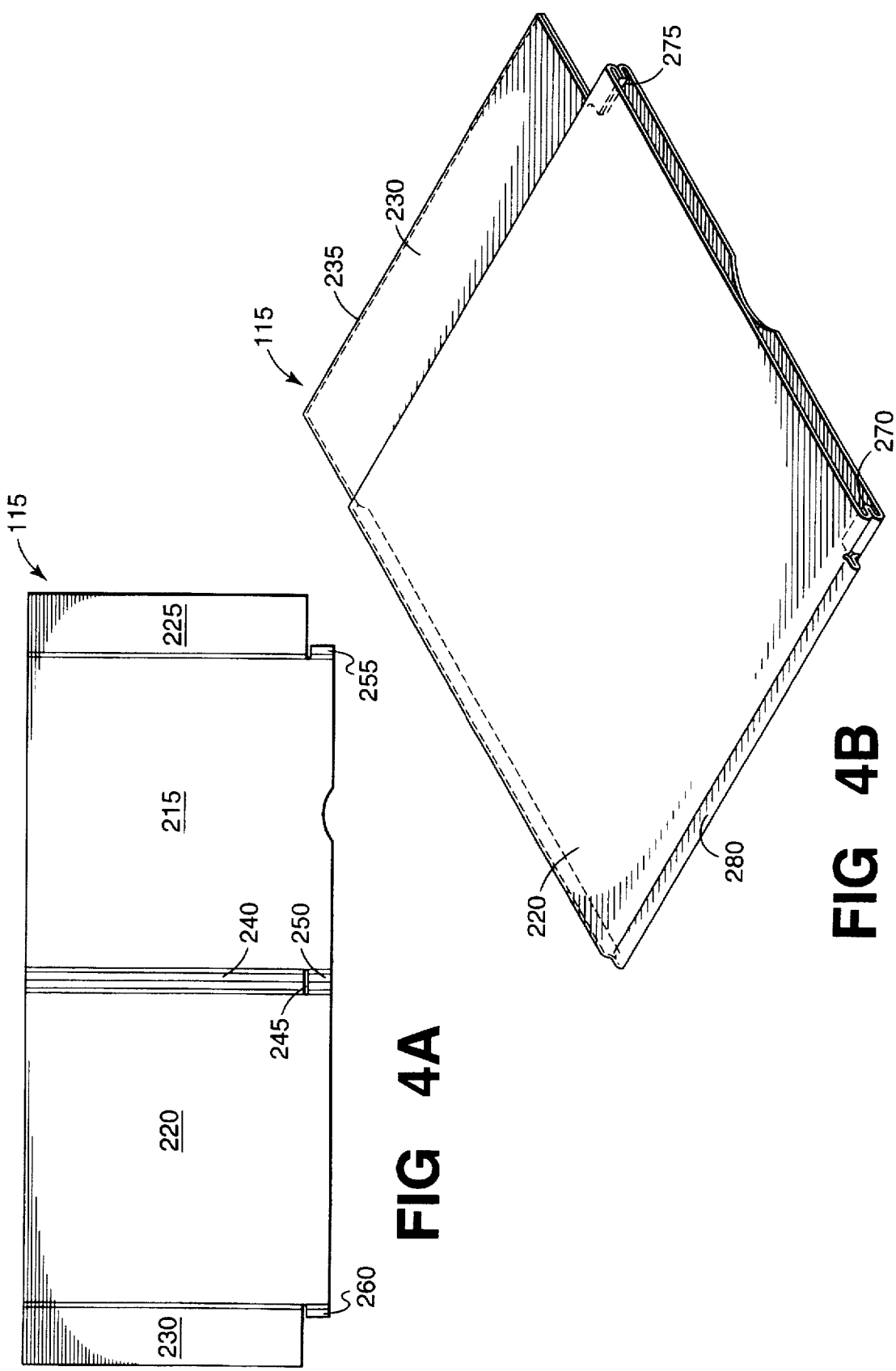

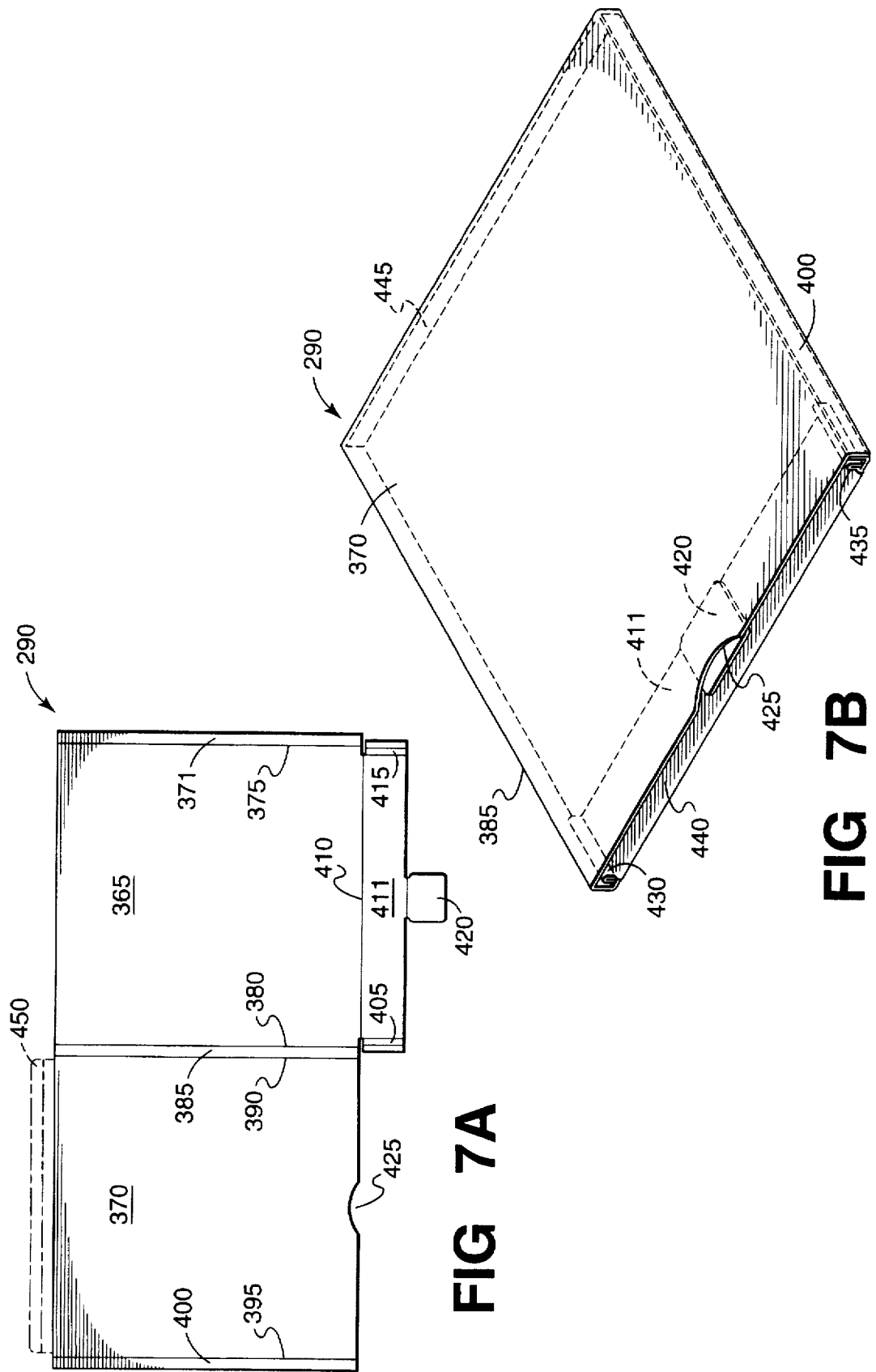

COMPACT DISK TRAY AND COVER THEREFOR

BACKGROUND OF THE INVENTION

1. Technical Field

This invention relates to a storage receptacle for optically readable compact disks ("CD's") and related promotional material. More specifically, this invention relates to a package system in which information storage media, such as compact disks, may be packaged with promotional material for retail sale, shipping through the mail, and for related uses.

2. Description of the Prior Art

FIG. 9 illustrates a typical compact disk container, which is normally referred to in the art as a "jewel box." Container 5' generally includes a base 10' which receives a tray 20'. Tray 20' may include a mounting hub 25' for receiving a mounting aperture 35' within optical disk 30'; a center surface 22' recessed within a top surface 21', and a rear platform 23'. Container 5' also includes a cover 15' which is hingedly mounted to base 10'. The cover and base are typically formed from clear polypropylene material for displaying promotional material mounted on inner surfaces thereof. Typical dimensions of the tray 20' include a maximum height K of approximately 8 mm and defined at a rear portion of the tray, from a bottom edge to a top surface of rear platform 23', a thickness of 1 mm at dimension H, a height I between a bottom edge of the tray and top surface 21' of approximately 4 mm, and a height J of approximately 6 mm, wherein J is defined by a distance between top front edge and a bottom edge of the tray. Additionally, a difference between the heights of Surfaces 21' and 22' is approximately 3 mm.

While a standard jewel box may be suitable for some retail environments, an increasing number of read-only-memory (ROM) optical disks are being sold or being offered in computer software promotional campaigns through the mail, the weight and relative size of the jewel box become a serious consideration when the compact disk or ROM optical disk is sent through the mail.

In the mail order application, the standard jewel box and tray insertion are too large, as they are considerably bigger than the standard compact disk stored therein. Additionally, since the jewel box is made primarily of plastic, its size and material composition create a weight which is considerably greater than the disk itself, which increases the vendors' shipping costs.

Additionally, when shipped through the mail, the standard jewel box requires yet another cardboard wrapping for preventing damage during shipping and for labelling purposes, which increases material costs for the finished product. The redundant cardboard material required for shipping also adds to the already bulky weight of the jewel box and further increases shipping costs.

Furthermore, standard compact disk containers are not conducive to attachment to magazines or technical or trade publications for promotional distribution of software or other electronically stored media. For example, standard jewel boxes tend to be thick and bulky when considered as a containment means for that application. Moreover, jewel boxes include no means for attachment to a magazine or publication.

SUMMARY OF THE INVENTION

The present invention recognizes and addresses the foregoing disadvantages, and others of prior art constructions and methods.

Accordingly, it is an object of the present invention to provide a receptacle for a compact disk or other electronic media storage devices which is compact, inexpensive to manufacture, durable, and inexpensive to ship.

It is another object of the present invention to provide a receptacle for storing and protecting a compact disk which is at least partially formed from a light-weight, foldable material.

It is another object of the present invention to provide a receptacle which is easily and inexpensively manufactured.

Generally speaking, the invention relates to an enclosure for protecting and securing an optical disk having a mounting aperture. The enclosure may include a tray adapted to house the disk, and a receptacle adapted to receive the tray and disk. The receptacle may be formed from a sheet of foldable material including means for releasably retaining the tray within the receptacle.

More specifically, the receptacle may be formed from a sheet of foldable material having portions which form top and bottom portions of the receptacle. The top and bottom portions of the sheet include front and rear edges. The foldable sheet includes at least one crease separating the top and bottom portions for allowing the top portion to be folded over the bottom portion to form an interior space therebetween. The receptacle formed from the foldable sheet may include a front opening defined by the front edges of the top and bottom portions, and a rear opening defined by the rear edges of the top and bottom portions.

The enclosure may also include an extension formed on the receptacle for attaching the receptacle to a retail delivery means, such as a centerfold of a magazine or a technical publication. For example, the foldable sheet forming the receptacle may further include a top extension portion including inside and outside surfaces attached to the top portion of the foldable sheet, and a bottom extension portion including inside and outside surfaces attached to the bottom portion of the foldable sheet, and means for attaching the inside surfaces of each extension portion together to form the extension. The attaching means may include glue between the inside extension surfaces, or any other equivalent for accomplishing the same purpose. The extension allows the receptacle to be attached to retail delivery means including, but not limited to, magazine or technical publication centerfolds, or hook mechanisms at retail stores.

The tray may include top and bottom surfaces, front, rear, and side walls, an annular recess formed in the top surface for receiving the compact disk, a mounting hub disposed in a center portion of the annular recess for receiving a mounting aperture of a compact disk, and gripping recesses formed on side portions of the tray for allowing a user to grip a peripheral edge of the compact disk when removing the compact disk from the mounting hub. The tray may be formed from any suitable material such as plastic or paper or a combination thereof.

The enclosure may also include retaining means for preventing the tray from moving with respect to the receptacle during the shipping and handling stages of product distribution. For example, the retaining means may comprise an outer layer of thin sheet material wrapped around the receptacle. Alternatively, the retaining means may include a glue spot securing inside surfaces of the top and bottom portions of the foldable sheet together at a location corresponding to at least one of the gripping recesses on the tray. That arrangement secures the tray in the receptacle until the disk is ready for use.

The enclosure may also include means for removing the retaining means, which may include perforations in the foldable material surrounding the glue spot such that the glue spot may be torn out for allowing movement of the tray with respect to the receptacle.

In addition to retaining means, the enclosure may also include motion limiting means for limiting a distance which the tray with respect to the receptacle and for preventing the tray from being completely removed from the receptacle when accessing the compact disk stored therein. For example, the motion limiting means may include at least one protrusion formed on an inside portion of the receptacle which engages corresponding elongated recesses on the tray. The tray may include the elongated recesses on its sidewalls or in its bottom surface. Generally, the elongated recesses may extend from near the tray front wall to near the tray rear wall and may further include an end wall defining a rear most portion of the elongated recesses, wherein the motion limiting means comprises the end wall. For example, as a consumer pulls the tray out of the receptacle the protrusions translate within their respective recesses from a front portion of the tray until the recess end walls are reached, thus preventing further motion and retaining the tray within the receptacle.

Separate flaps connected to the foldable sheet may form the protrusions which engage the elongated recesses in the tray. Furthermore, the foldable sheet may include at least two creases between the top and bottom portions to form a substantially tetrahedron-shaped receptacle for receiving the tray. Additionally, the foldable sheet may include a front flap for covering the receptacle front opening, and/or a rear flap for covering the receptacle rear opening. Finally, the foldable sheet may be fabricated from any foldable material, including, but not limited to paper, cardboard, polymer sheets, or cellulose-polymer composite.

Other objects, features and aspects of the present invention are discussed in greater detail below.

BRIEF DESCRIPTION OF THE DRAWINGS

The accompanying drawings illustrate the preferred embodiment of the invention, and serve to aid in the explanation of the principles of the invention.

FIG. 2A is a plan view of a sheet of foldable material which forms a receptacle portion of an enclosure according to the present invention.

FIG. 2B is a perspective view of an enclosure according to the present invention illustrating a tray and CD inserted into the receptacle as shown in hidden lines.

FIG. 4A is a plan view of a sheet of foldable material which forms another embodiment of a receptacle portion of an enclosure according to the present invention.

FIG. 4B is a perspective view of a receptacle formed from the sheet of foldable material illustrated in FIG. 4A.

FIG. 7A is a plan view of a sheet of foldable material which forms another embodiment of a receptacle portion of an enclosure according to the present invention.

FIG. 7B is a perspective view of a receptacle formed from the sheet of foldable material illustrated in FIG. 4A.

DETAILED DESCRIPTION OF THE INVENTION

Figure 1:
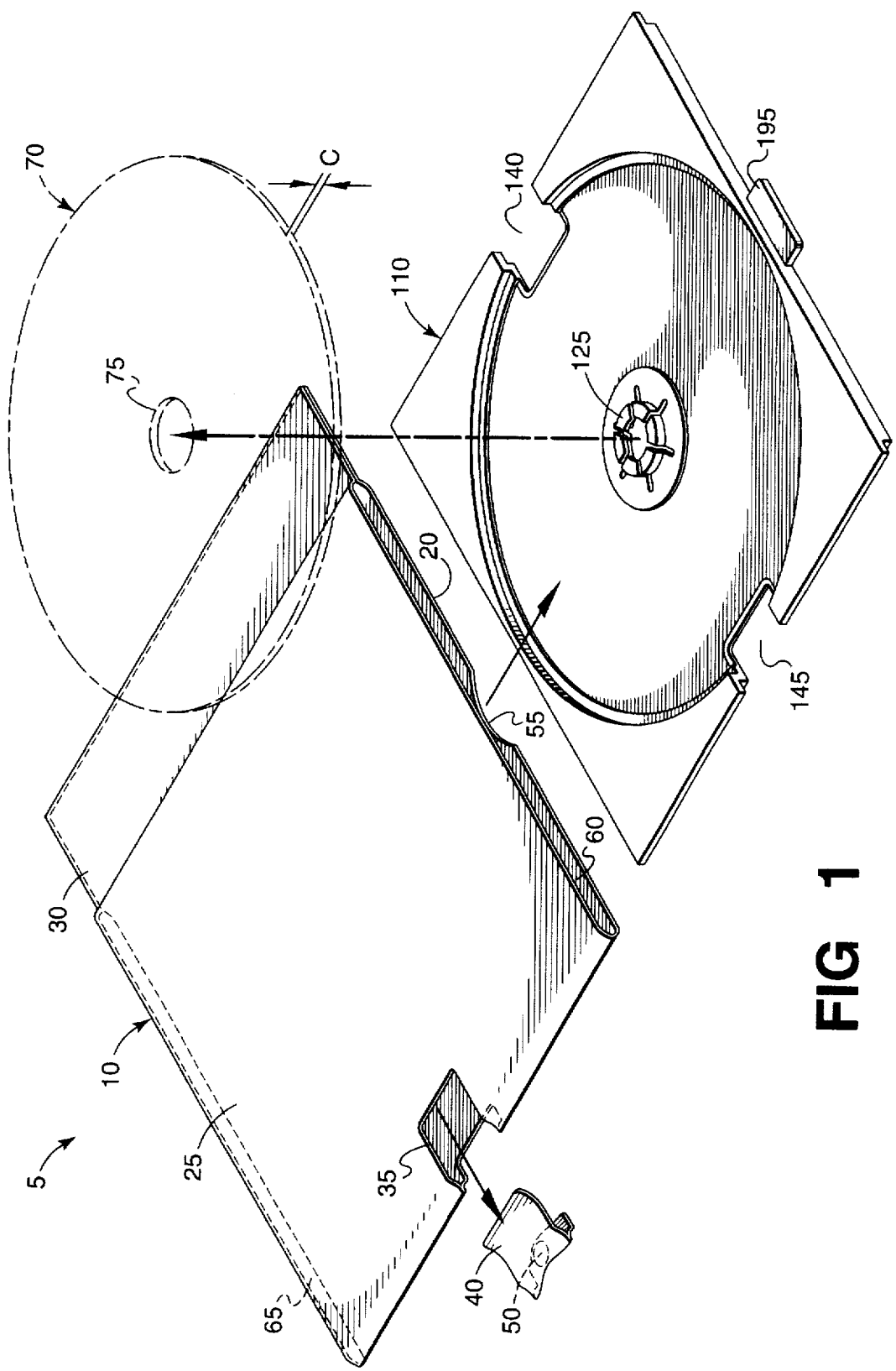
FIG. 1 is an exploded perspective view of an enclosure system according to the present invention.

FIG. 1 illustrates a first embodiment of the enclosure system 5 according to the present invention. Enclosure system 5 includes a paper receptacle 10 and a tray 110 for mounting a compact disk thereon. Tray 110 fits within receptacle 10 and includes a mounting hub 125 for receiving a mounting aperture 75 of a compact disk 70. Receptacle 10 includes a front opening 60, a rear opening 65, and a gripping aperture 55 to provide access to pull tab 195 on tray 110.

Referring to FIGS. 2A and 2B as well as FIG. 1, receptacle 10 is essentially formed from a single sheet of foldable material. This material may be cardboard, paper, or any other material which may be folded and attached in the manner shown in FIGS. 1, 2A, and 2B. Referring to FIG. 2A, the unassembled receptacle is essentially comprised of a sheet of foldable material comprising a bottom portion 20, a top portion 25, and a tear out portion 40 which is defined by the perforation edge 35. Creases or folds separate extensions 30 from each of top and bottom portions 25 and 20. Additionally, the foldable sheet may include flaps 80 and 85 for covering rear and front openings 65 and 60, respectively. As is seen from FIGS. 2A and 2B, the foldable sheet is generally creased at its center, wrapped around tray 110, and fastened together at extension 30 with glue or any other suitable means of attaching inside surfaces of extension portions 30 to form the receptacle.

Figure 3A:
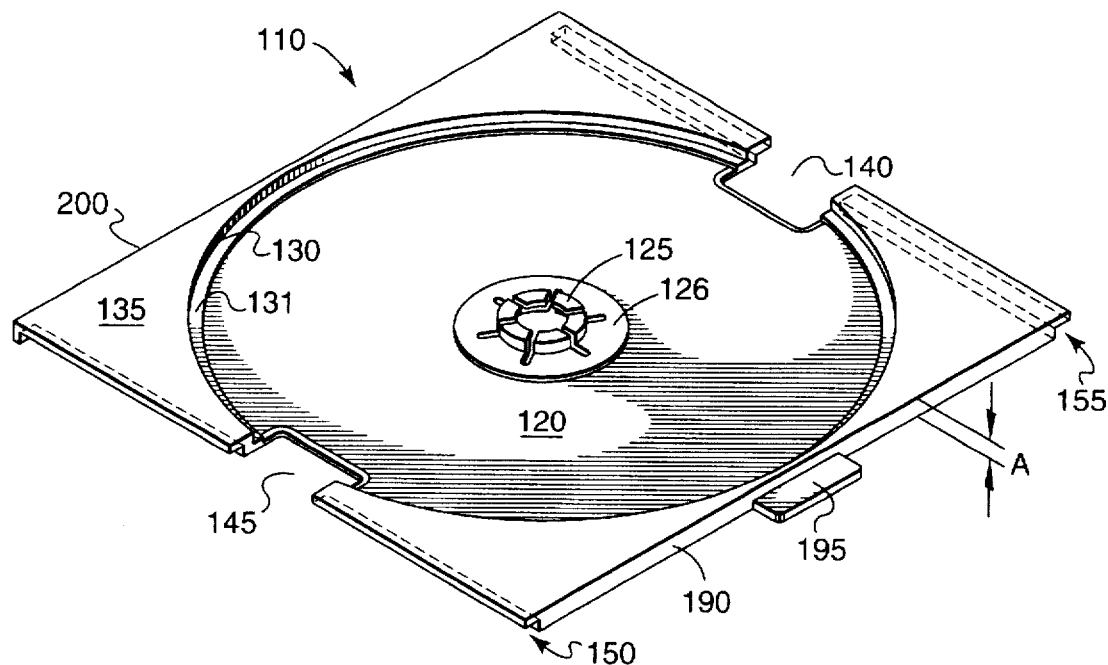
FIG. 3A is a top, front, left side perspective view of a tray used in accordance with the inventive enclosure system.
Figure 3B:
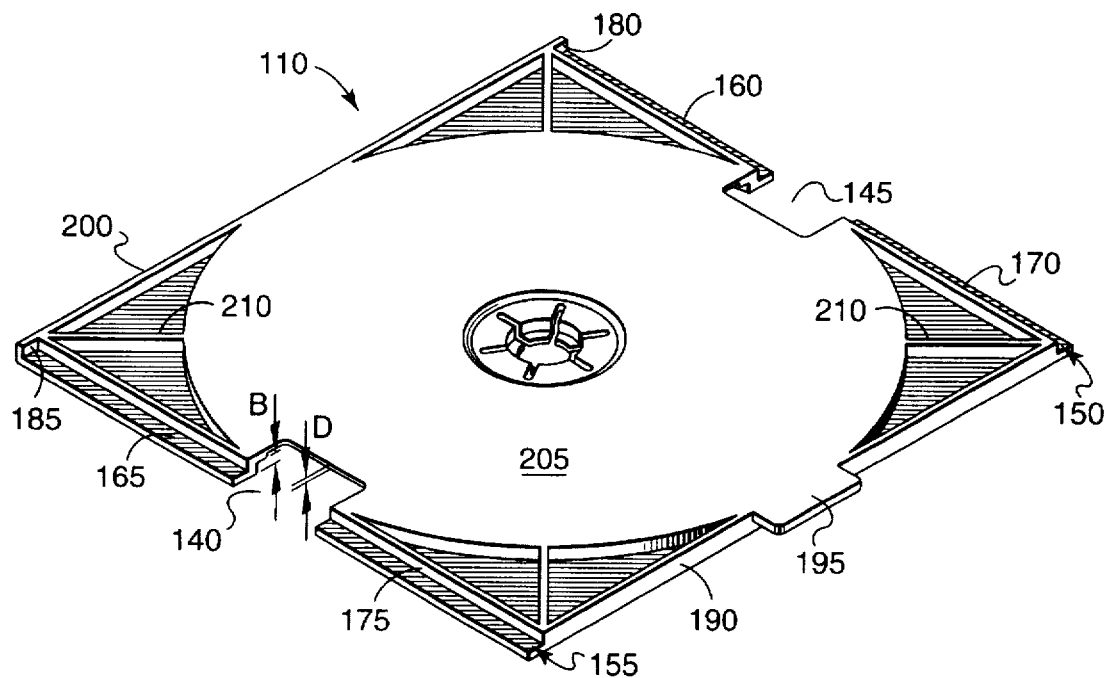
FIG. 3B is a bottom, right side, front perspective view of the tray illustrated in FIG. 3A, as shown in an upside down position.

FIGS. 3A and 3B illustrate tray 110 in greater detail. Tray 110 includes a center surface 120 recessed within top surface 135 and bordered by wall 130. Annular surface 130 provides enhanced protection to the disk. Tray 110 also includes gripping hub 125 extending upward from a raised center surface 126 for receiving a mounting aperture of a compact disk. Tray 110 also includes gripping apertures 140 and 145 for allowing the user to grasp outer portions of the compact disk when placing the disk into the tray or removing the compact disk from the tray. A bottom surface 205 of tray 110 includes elongated slots 150 and 155. Elongated slot 150 is defined by top wall 160, side wall 170, and back wall 180. Similarly, elongated slot 155 is defined by top wall 165, side wall 175, and back wall 185. Tray 110 also includes a pull tab 195 in front wall 190.

Minimizing the risk of damage to the disk during shipping through various mail or letter carrying services becomes particularly important to tray design considerations. Specifically, the reflective substrate which contains the disk's digital information is located closest to the disk's bottom surface, which makes the bottom surface of the disk most vulnerable to scratching and wear damage. Raised annular surface 131 is disposed immediately within wall 130 and provides a mounting surface for an outer periphery of a compact disk. Therefore, raised annular surface 331 provides adequate support for the disk, peripheral to the sensitive substrate area near the disk bottom surface, while preventing contact between a bottom surface of the disk and surface 120 of the tray to prevent scratching of the bottom disk surface during shipping.

Strength, size, and weight requirements associated with a package which is designed to be sent through the mail or other shipping services place unusual design requirements on various dimensions of tray 110. For example, it is desirable to make tray 110 as thin as possible to improve an outer overall appearance of wrappings that envelope the tray. Furthermore, reducing a thickness of the tray of the present invention as compared to a conventional compact disk tray reduces tray weight and overall package shipping costs. FIG. 3A illustrates a total thickness A for tray 110. Although thickness A may range from 2.0 mm and greater, in the preferred embodiment of the present invention, thickness A should be approximately 3.4 millimeters (mm). Additionally, in a preferred embodiment, a height of ridge 131 with respect to surface 120 should be approximately 0.5 mm, representing a height which may achieve a separation between surface 120 and a bottom surface of the compact disk resting on the ridge 131, although the height of ridge 131 may range from 0.2 mm to virtually any height. Thickness D represents an appropriate thickness of a bottom portion of tray 110. Depending on material strength, thickness D may be at least 0.2 mm, its preferable thickness is approximately 0.4 mm. Height B represents a height of annular wall 130 with respect to ridge 131, which should be equal to or only slightly greater than the thickness C (illustrated in FIG. 1) of a standard compact disk so as to allow the disk to sit below top surface 135, and thus protect a top surface of the disk since the top disk surface is usually most vulnerable to damage. Thus the height of ridge 131 may be 1 mm or greater. In a preferred embodiment, height B is approximately 2.5 mm.

Also incorporated into bottom surface 205 of tray 110 are strengthening ribs 210 for stiffening the tray and for enhancing protection of the compact disk. These ribs are important since the overall thickness of the tray is thinner than a thickness of conventional compact disk trays, and because the thickness D must be very thin. Ribs 210, which are injection-molded with wall 130 to form a single unitary piece, form an important structure for providing stiffness to tray 110, and serve to further protect a disk from damage during shipping.

The enclosure system illustrated in FIG. 1 may be assembled in several ways. The sheet of foldable material which comprises the receptacle 10 may be preformed, prefolded and preglued and tray 110 with disk 70 may be inserted into the receptacle afterwards. Alternatively, the receptacle 10 may be wrapped around tray 110 and glued at extension 30 thereafter. Furthermore, the entire enclosure system 5 may be wrapped in a thin clear plastic material.

The enclosure system 5 may also include several means for retaining disk tray 110 within receptacle 10. A first means for retaining a tray within the receptacle may comprise simply a thin clear plastic material wrapped around the enclosure system after the tray has been inserted into the receptacle. Alternatively, or in addition to the clear plastic material, a glue spot may be applied to the foldable material as shown in FIG. 1. Specifically, glue spot 50 corresponds to the location of tear out 40 within gripping aperture 145 on this tray 110. As seen in FIG. 2B, that the bottom portion 20 may be fastened to the top portion 25 of receptacle 10 at the location of gripping aperture 145 to prevent any movement of tray 110 with respect to receptacle 10.

The receptacle may also include means for removing the glue spot. Specifically, this removal means may comprise a perforated edge 35 as seen in FIG. 2A to facilitate tearing of the glue spots out of the receptacle so as to allow the tray 110 to be pulled out of the receptacle 10 by a tab 195 by a consumer.

Enclosure system 5 also includes an extension mechanism 30 which allows the enclosure to be attached to a number of items which may provide a retail delivery means for the enclosure system. For example, the extension 30 may be stapled to a centerfold of a magazine so as to deliver a CD ROM to a magazine subscriber in a promotion campaign of software, music, or other medium which can be digitally recorded onto an optical disk. Furthermore, the extension 30 allows the package to be hung on a prong in a retail environment. The enclosure system 5 is very inexpensive to manufacture since there are essentially 3 pieces. They include the receptacle, the tray and the disk. Typically, the receptacle will be made of a cardboard or thick paper, however, any other suitable foldable material is within the scope of this invention and may be used to form a receptacle according to the present invention.

Figure 5:
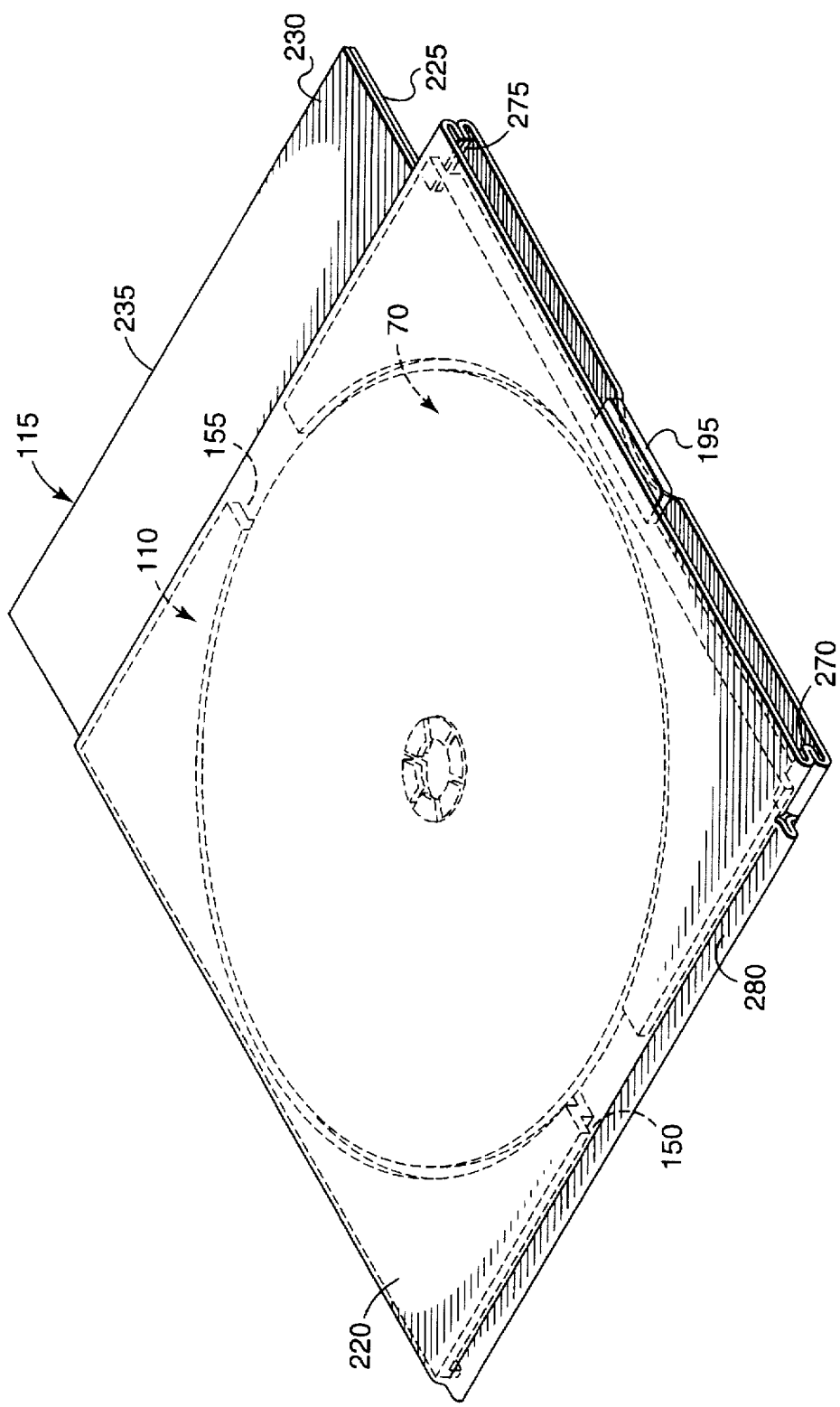
FIG. 5 is a perspective view of the enclosure of the present invention illustrating a tray and CD shown in hidden lines which is inserted into the receptacle of FIG. 4B.

FIGS. 4A, 4B and 5 illustrate a second embodiment of a receptacle according the present invention. Receptacle 115 includes a bottom portion 215 and a top portion 220 separated by a folded area 240 which may include several creases as is explained in greater detail below. Additionally, attached to bottom portion 215 are extension and protrusion elements 225 and 255, respectively. Similarly, attached to top portion 220 are extension element 230 and protrusion 260. Slit 245 separates folded area 240 from protrusion fold area 250. As is illustrated in FIG. 4B, receptacle 115 may be assembled in a manner similar to that of receptacle 110 except that receptacle 115 includes a crimped area 280 and protrusions 270 and 275 which are formed from protrusion areas 260, 250 and 255. For example, when the foldable sheet is folded to form receptacle 115, protrusion fold area 250 is crimped in the opposition direction than outward folded portion 280 to create an inner fold area or protrusion 270. Furthermore, protrusion elements 255 and 260 may be glued together to form an inside protrusion 275.

As illustrated in FIG. 5, extension elements 225 and 230 form extension 235, and protrusions 270 and 275 may comprise motion limiting means for the tray and receptacle within the enclosure system. For example, the inside protrusions 270 and 275 cooperate with elongated slots 150 and 155. When the tray is nearly pulled all the way out of receptacle 115 back walls 180 and 185 engage protrusion 270 and 275, respectively, to prevent the tray from being completely pulled out of the receptacle. Additionally, the protrusions 270 and 275 in conjunction with the respective elongated slots help guide the tray into and out of the receptacle when the consumer accesses the disk stored therein.

Figure 6A:
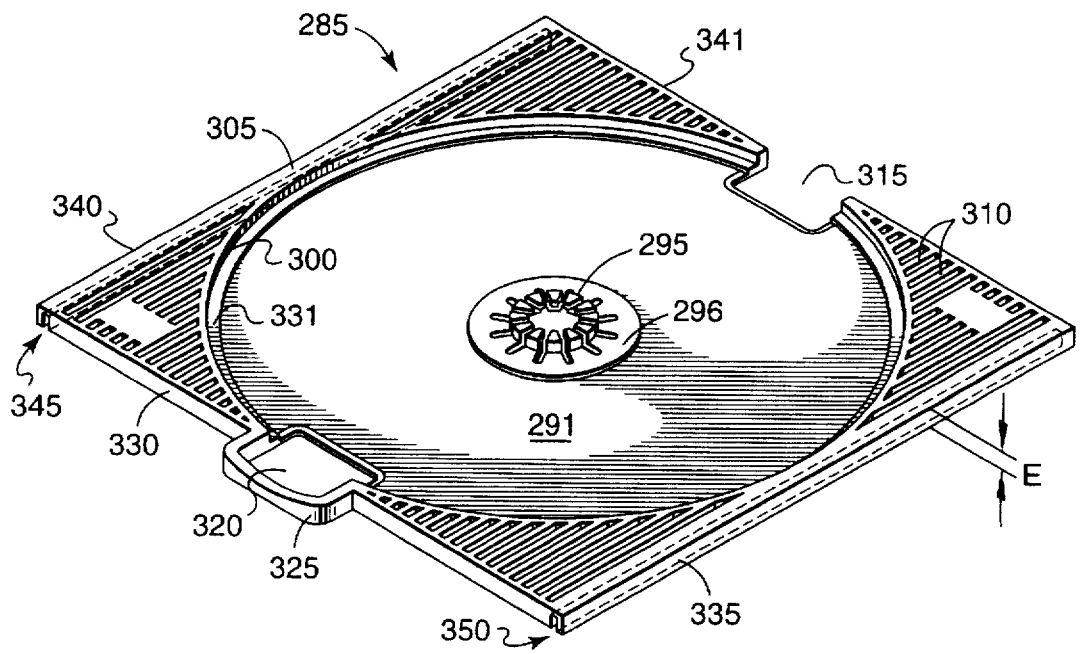
FIG. 6A is a top, front, right side perspective view of a second embodiment of a tray used in accordance with the inventive enclosure system.
Figure 6B:
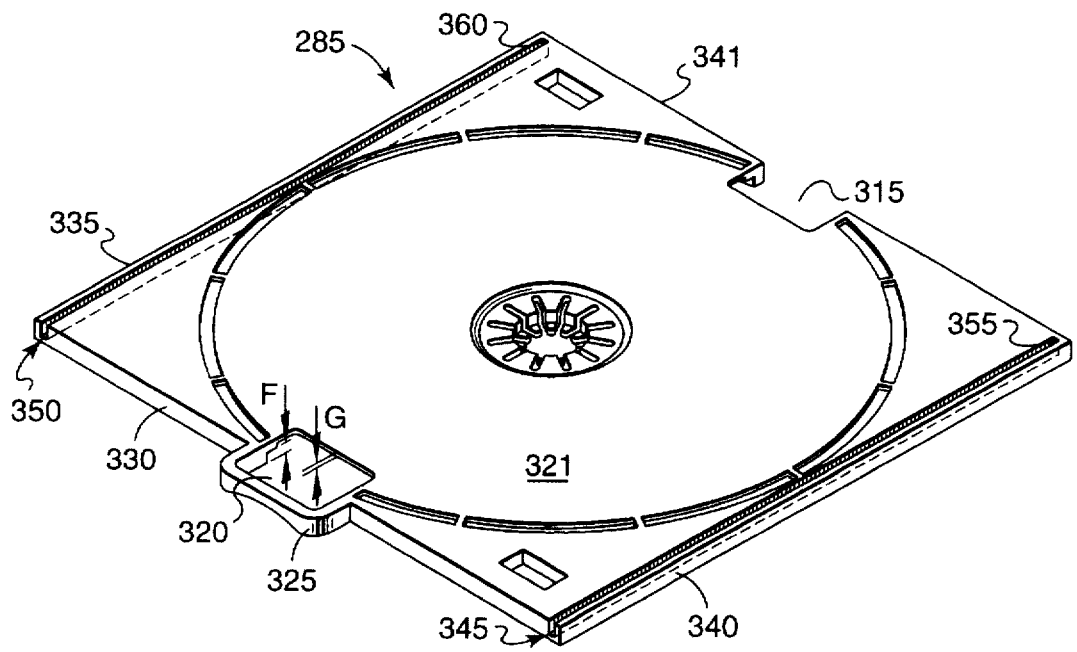
FIG. 6B is a bottom, front, left side perspective view of the tray illustrated in FIG. 6A, as shown in an upside down position.

FIGS. 6A and 6B illustrate an alternative embodiment of a tray for use with a enclosure system in accordance with the present invention. Compact disk tray 285 includes a recessed surface 291 together with mounting hub 295 extending upward from a raised center surface 296 for accepting the mounting aperture of a compact disk. Tray 285 also includes annular ridge 331 which accepts an outer periphery of a compact disk. A top surface 305 should be at a greater height than the compact disk when the disk is mounted in the tray. That arrangement allows the disk to be recessed within the tray so as to protect the vulnerable top surface of the disk from an inside surface of the receptacle. Additionally, the compact disk tray 285 includes gripping apertures 315 and 320 for allowing the user to grip an outer periphery of the compact disk when placing it onto or removing it from the tray 285. Additionally, compact disk tray 285 includes front wall 330, side wall 335, side wall 340 and back wall 341.

A top surface of the tray 285 includes a plurality of strengthening ribs 310 which run from a center portion to corners of the tray. These ribs are important since the overall thickness of the tray is thinner than conventional compact disk trays, and because the middle portion of the tray must be very thin. Ribs 210, which are injection-molded with wall 130 to form a single unitary piece, form an important structure for providing stiffness to tray 110, and serve to further protect a disk from damage during shipping.

As discussed above, strength, size, and weight requirements associated with a package which is designed to be sent through the mail or other shipping services place unusual design requirements on various dimensions on trays designed to be shipped through the mail. It is desirable to make tray 285 as thin as possible to improve an outer overall appearance of wrappings that envelope the tray. Furthermore, reducing a thickness of the tray of the present invention as compared to a conventional compact disk tray reduces tray weight and overall package shipping costs. FIG. 6A illustrates a total thickness E for tray 285. Although thickness E may range from 2.0 mm and greater, in a preferred embodiment the thickness E should be approximately 3.4 (mm). Additionally, a height of ridge 331 with respect to surface 291 may be from approximately 0.2 mm and greater, but in a preferred embodiment is approximately 0.5 mm, representing a height which may achieve a separation between surface 291 and a bottom surface of the compact disk which rests on the ridge 331. Thickness G represents an appropriate thickness of a bottom portion of tray 285, which, depending on material properties, should be at least 0.2 mm. However in a preferred embodiment, thickness G is approximately 0.4 mm. Height F represents a height of annular wall 300 with respect to ridge 331, which should be equal to or only slightly greater than the thickness C (illustrated in FIG. 1) of a compact disk so as to allow the disk to sit below surface 305, for protecting a top surface of the disk. Thus, height F should be 1 mm or greater. In a preferred embodiment, height F is approximately 2.5 mm.

Referring specifically to FIG. 6B which illustrates a bottom side of the compact disk tray 285, the bottom surface 321 includes elongated slots 345 and 350 which are set inwardly of side walls 340 and 335, respectively. Slots 345 and 350 include end walls 355 and 360, respectively. Additionally, tray 285 includes a front pull tab 325 which coincides with gripping aperture 320 as seen in FIGS. 6A and 6B.

FIG. 7A and 7B illustrate still another embodiment of a receptacle for an enclosure in accordance with the present invention. Receptacle 290 includes a foldable sheet comprising a bottom portion 365, a top portion 370, a side flap 371 and a side wall 400. Additionally, the foldable sheet includes an elongated flap 411 and an extension flap 420 attached thereto. Crease 375 separates side flap 371 from the bottom portion 365. Additionally, creases 380 and 390 separate side wall 385 from bottom and top portions 365 and 370. Similarly, crease 395 separates top portion 370 from side wall 400. Finally, crease 410 separates elongated flap 411 from bottom portion 365.

Figure 8:
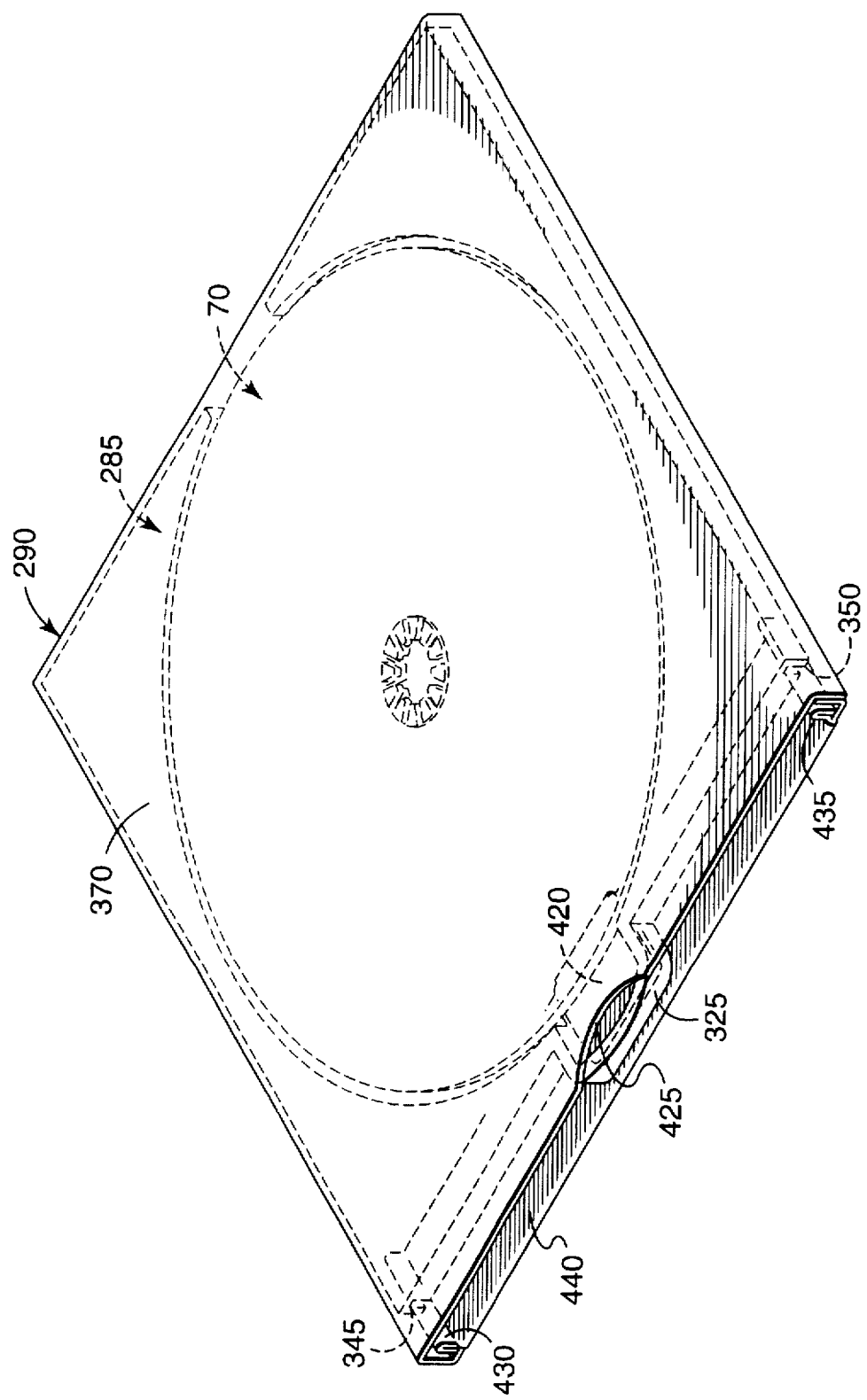
FIG. 8 is a perspective view of an enclosure of the present invention illustrating a tray and CD shown in hidden lines which is inserted into the receptacle of FIG. 7B.
Figure 9:
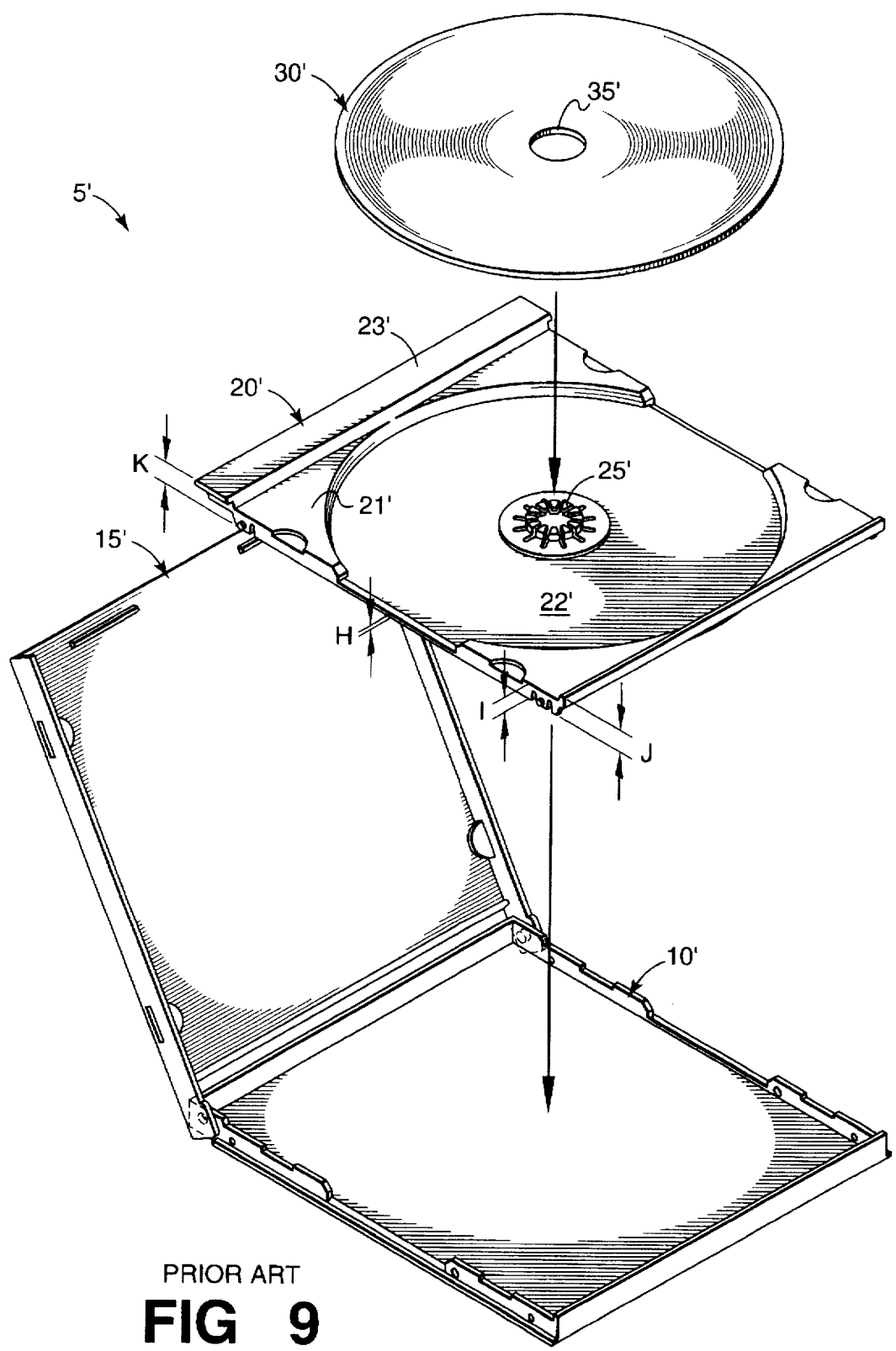
FIG. 9 illustrates an exploded perspective view of a prior art CD container.

As seen in FIG. 7B, protrusion fold portion 405 and 415 form upwardly projecting protrusions 430 and 435 within the receptacle when elongated flap 411 and flap extension 420 are folded into an inside portion of the receptacle. Grip recess 425 also allows the user to access the pull tab as is seen in FIG. 8. Furthermore, a center portion of the pull tab 325 receives extension flap 420 to secure the tray within the receptacle again as seen in FIG. 8.

As seen in FIG. 7B, the receptacle includes front opening 440 and rear opening 445. Rear opening 445 may be covered by a rear flap 450. Rear flap 450 may also serve as an extension for allowing the receptacle to be attached to a centerfold of a magazine or technical publication. A flap may also be incorporated into the foldable sheet to cover front opening 440 although it is not shown in this embodiment. Protrusions 430 and 435 are adopted to engage elongated slots 345 and 350 on the tray 285. Protrusions 345 and 350 smoothly translate with respect to the receptacle and also provide a motion limiting means. Elongated slots 345 and 350 include end walls 355 and 360 to engage protrusions 430 and 435, and therefore comprise motion limiting means when the tray reaches the end of its travel within the receptacle. Finally, tray 285 and receptacle 290 may also be secured together by clear plastic material for protection during shipping.

For all embodiments of the present invention, the tray strengthening ribs in combination the dimensional requirements are very important since no stiff outer casing is included with the inventive compact disk packages other than foldable material for covering the inventive trays. Thus, the trays as set forth in the present invention must derive their stiffness from the strengthening ribs which are molded integrally with the trays. The dimensions of the trays may have a reasonable range and still be within the scope of the present invention. The trays may be formed from any material, but in a preferred embodiment, they may be injection-molded from virtually any plastic resin material which satisfies the stiffness requirements of the present invention.

It should be understood that various changes to the present invention may be made by the ordinarily skilled artisan, without departing from the spirit and scope of the present invention which is presented in the claims below. The ordinarily skilled artisan will understand that this disclosure presents an example of the invention and is not meant to limit the invention, as presented in the claims, in any way whatsoever.

What is claimed is:

1. An enclosure for protecting and securing an optical disk having a mounting aperture, said enclosure comprising:
   a tray adapted to receive the disk on a top portion thereof, wherein said tray includes a supporting surface for supporting said disk, wherein said tray has a maximum height ranging from approximately 2 mm to approximately 6 mm; and
   a receptacle formed from a sheet of foldable material including means for slidingly receiving said tray therein.

2. The enclosure of claim 1 further comprising:
   means for releasably retaining said tray within said receptacle.

3. The enclosure of claim 1 further comprising:
   gripping means on said tray for facilitating removal of said tray from said receptacle.

4. The enclosure of claim 1 further comprising:
   motion limiting means for limiting a distance by which said tray slides with respect to said receptacle.

5. The enclosure of claim 4 wherein said motion limiting means prevents said tray from being removed from said receptacle.

6. The enclosure of claim 1 further including retaining means for preventing movement of said tray with respect to said receptacle.

7. The enclosure of claim 6 wherein said retaining means comprises an outer layer of thin sheet material wrapped around said receptacle.

8. The enclosure of claim 1 further including an extension formed on said receptacle for attaching said receptacle a retail delivery means.

9. An enclosure for protecting and securing an optical disk having a mounting aperture, said enclosure comprising:

a tray adapted to receive the disk on a top portion thereof; and a receptacle for slidingly receiving said tray, said receptacle formed from a sheet of foldable material, said receptacle, including a top portion of said sheet including front and rear edges, a bottom portion of said sheet including front and rear edges, at least one crease separating said top and bottom portions for allowing said top portion to be folded over said bottom portion to form an interior space there between, a front opening defined by said front edges of said top and bottom portions;

a rear opening defined by said rear edges of said top and bottom portions; and a top extension member for attaching said receptacle to a retail delivery means, said top extension including inside and outside surfaces, attached to said top portion;

at least one crease in said sheet between said top portion and said top extension member;

a bottom extension member including inside and outside surfaces attached to said bottom portion;

at least one crease in said sheet between said bottom portion and said bottom extension member; and means for attaching said inside extension surfaces of said top and bottom extension members to form an extension member.

10. The enclosure of claim 9 wherein said attaching means includes glue between said inside extension surfaces.

11. The enclosure of claim 9 wherein said tray further includes:

top and bottom surfaces;

front, rear, and side walls;

an annular recess formed in said top surface for receiving the compact disk;

a mounting hub disposed in a center portion of the annular recess for receiving a mounting aperture of the compact disk; and gripping recesses formed on side portions of said tray for allowing a consumer to grip a peripheral edge of the compact disk when removing the compact disk from said mounting hub.

12. The enclosure of claim 9 further including tray retaining means for releasably retaining said tray within said receptacle.

13. The enclosure of claim 12 further including means for removing said retaining means for allowing movement of said tray with respect to said receptacle.

14. The enclosure of claim 12 wherein said retaining means includes a glue spot securing inside surfaces of said top and bottom portions of said foldable sheet together at a location corresponding to at least one of said gripping recesses on said tray.

15. The enclosure of claim 14 including perforations in said foldable material surrounding said glue spot such that said glue spot may be torn out for allowing movement of said tray with respect to said receptacle.

16. The enclosure of claim 10 further including means for guiding movement of said tray with respect to said receptacle.

17. The enclosure of claim 16 further including motion limiting means for limiting a distance that said tray moves out of said receptacle.

18. The enclosure of claim 17 wherein said motion limiting means includes at least one protrusion formed on an inside portion of said receptacle and corresponding elongated recesses on said tray.

19. The enclosure of claim 18 wherein said at least one protrusion is formed from at least one protrusion flap connected to said foldable sheet.

20. The enclosure of claim 18 wherein said corresponding elongated recesses are formed on said sidewalls of said tray.

21. The enclosure of claim 18 wherein said corresponding elongated recess are formed in said bottom surface of said tray.

22. The enclosure of claim 18 wherein said corresponding elongated recesses extend from near said tray front wall to near said rear wall and further include and an end wall defining a rear most portion of said elongated recesses, and said motion limiting means comprises said end wall.

23. The enclosure of claim 9 wherein said foldable sheet includes at least two creases between said top and bottom portions to form a substantially tetrahedron-shaped receptacle for receiving said tray.

24. The enclosure of claim 9 wherein said foldable sheet includes a front flap for covering said receptacle front opening.

25. The enclosure of claim 9 wherein said foldable sheet includes a rear flap for covering said receptacle rear opening.

26. An enclosure for protecting and securing an optical disk having a mounting aperture, said enclosure comprising:

a tray adapted to receive the disk on a top portion thereof; and a receptacle for slidingly receiving said tray, said receptacle formed from a sheet of foldable material, said receptacle, including a top portion of said sheet including front and rear edges;

a bottom portion of said sheet including front and rear edges;

at least one crease separating said top and bottom portions for allowing said top portion to be folded over said bottom portion to form an interior space there between, a front opening defined by said front edges of said top and bottom portions;

a rear opening defined by said rear edges of said top and bottom portions;

an extension member extending from either said top or bottom portion beyond the periphery of said receptacle for attaching said receptacle to a retail delivery means;

tray retaining means for releasably retaining said tray within said receptacle; and removal means for removing said retaining means for allowing movement of said tray with respect to said receptacle.

* * * * *